(No Model.)
W. H. POULK.
PUMP.
No. 490,985. Patented Jan. 31, 1893.
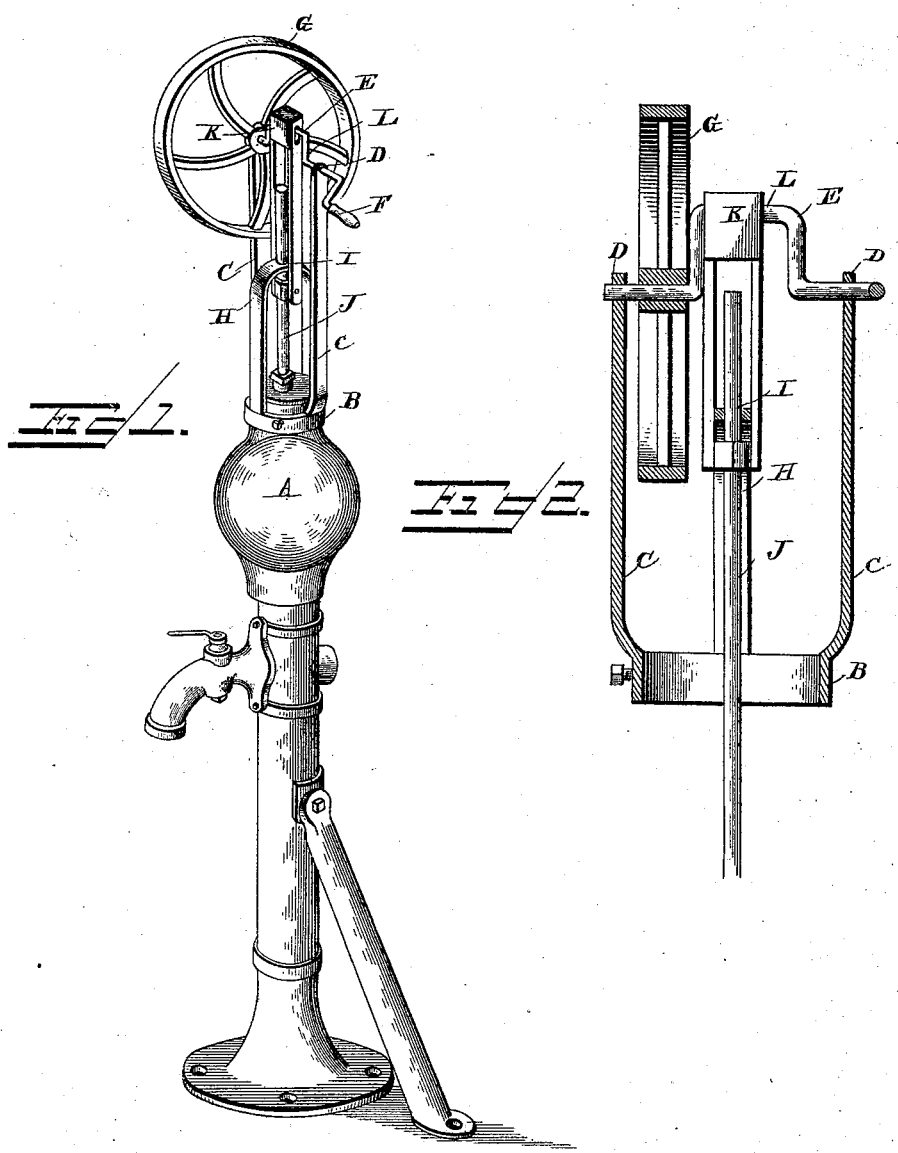
Witnesses
W. E. Schneider
John M. Liggas
Inventor
W. H. Poulk
By his Attorneys,
C. A. Snow & Co.

UNITED STATES PATENT OFFICE.

WILLIAM HARDY POULK, OF CAIRO, GEORGIA.

PUMP.

SPECIFICATION forming part of Letters Patent No. 490,985, dated January 31, 1893.

Application filed August 25, 1892. Serial No. 444,069. (No model.)

*To all whom it may concern:*

Be it known that I, WILLIAM HARDY POULK, a citizen of the United States, residing at Cairo, in the county of Thomas and State of Georgia, have invented a new and useful Pump, of which the following is a specification.

This invention relates to pumps; and it has for its object to provide an improved pump operating attachment which can be readily and conveniently attached to any make of pump cylinders or stands, and which at the same time provides an improvement whereby the pump can be easily and rapidly operated.

To this end the invention contemplates general improvements in pump operating attachments.

With these and many other objects in view which will readily appear as the nature of the invention is better understood, the same consists in the novel construction, combination and arrangement of parts hereinafter more fully described, illustrated and claimed.

In the accompanying drawings;—Figure 1 is a perspective view of a pump provided with an attachment constructed in accordance with this invention. Fig. 2 is a vertical longitudinal sectional view of the attachment detached from the pump.

Referring to the accompanying drawings;— A represents a pump cylinder or stand, to the upper end of which is removably clamped the attaching ring or band B of the attachment. Arising from opposite sides of the ring or band B, are the opposite parallel bearing arms or uprights C, at the upper ends of which are arranged the bearings D, accommodating the horizontal crank shaft E. The said crank shaft E is provided at one end with the crank handle F, by means of which the same can be readily turned, and carries near its other end the balance wheel G which greatly assists the rotation of said shaft. Intermediate of the opposite parallel bearing arms or uprights C and at right angles thereto is the curved guide yoke H, the opposite lower ends of which arise from the ring or band B, and the same is provided at the upper curved end thereof with the guide perforation I which receives the vertically moving piston rod J, thus held and guided in its vertical reciprocation. A swinging slotted connecting rod or pitman K, is pivotally connected at its upper end to the crank L, of said crank shaft, and has the slot thereof work over the upper curved end of the guide yoke and the upper end of the reciprocating piston rod, said slotted connecting rod being pivotally connected at its lower end within the inclosing guide yoke below the upper curved end thereof to said piston rod.

It will be readily seen that as the shaft E is rotated, the crank thereof swings the connecting rod or pitman therewith and thereby communicates a positive reciprocatory movement to the piston rod.

The attachment can be readily clamped to any pump stand or cylinder.

Having thus described my invention, what I claim and desire to secure by Letters Patent is;—

In a pump attachment, the combination with a pump cylinder or stand and a piston rod moving vertically therein; of the attaching ring or band removably clamped to the upper end of said cylinder or stand, opposite parallel bearing arms or uprights arising from opposite sides of said ring or band and provided with bearings at their upper ends, a horizontal crank shaft mounted in the bearings at the upper ends of said arms, a balance wheel mounted upon the shaft at one end thereof between said arms, a curved guide yoke arranged between said arms at right angles thereto and provided with a guide perforation in its upper curved end adapted to receive the piston rod, and a slotted connecting rod pivotally connected at its upper end to the crank of said crank shaft and at its lower end to said piston rod below the upper curved end of said yoke, substantially as set forth.

In testimony that I claim the foregoing as my own I have hereto affixed my signature in the presence of two witnesses.

WILLIAM HARDY POULK.

Witnesses:
J. S. MERRILL,
G. W. GROWER.